United States Patent [19]

Noro

[11] Patent Number: 5,475,580
[45] Date of Patent: Dec. 12, 1995

[54] POWER SUPPLY CIRCUIT

[75] Inventor: Masao Noro, Hamamatsu, Japan

[73] Assignee: Yamaha Corporation, Japan

[21] Appl. No.: 282,417

[22] Filed: Jul. 28, 1994

Related U.S. Application Data

[63] Continuation of Ser. No. 896,214, Jun. 10, 1992, abandoned.

[30] Foreign Application Priority Data

Jun. 11, 1991 [JP] Japan ..................................... 3-166383

[51] Int. Cl.$^6$ .................................................... H02M 3/335
[52] U.S. Cl. .............................. 363/24; 363/134; 363/16; 363/98
[58] Field of Search .................................. 363/24, 25, 26, 363/16, 17, 97, 98, 134

[56] References Cited

U.S. PATENT DOCUMENTS

| | | | |
|---|---|---|---|
| 4,685,041 | 8/1987 | Bowman et al. . | |
| 4,706,252 | 11/1987 | Egawa et al. ................ | 363/24 |
| 4,814,962 | 3/1989 | Magalhaes et al. . | |
| 4,857,822 | 8/1989 | Tabisz et al. ................ | 323/282 |
| 5,073,849 | 12/1991 | Morris ........................ | 363/21 |
| 5,157,593 | 10/1992 | Jain ............................. | 363/17 |
| 5,159,541 | 10/1992 | Jain ............................. | 363/26 |
| 5,317,494 | 5/1994 | Noro ........................... | 363/18 |

FOREIGN PATENT DOCUMENTS

| | | |
|---|---|---|
| 61-295875 | 12/1986 | Japan . |
| 3-27768 | 2/1991 | Japan . |

Primary Examiner—Peter S. Wong
Assistant Examiner—Adolf Berhane
Attorney, Agent, or Firm—Graham & James

[57] ABSTRACT

A power supply circuit of a switching inverter type includes a switching circuit including two switching elements capable of being alternately on-off controlled for converting an input from a dc power source into ac by switching of the switching elements and outputting it, a dc output circuit for full-wave rectifying and smoothing a supplied ac input to provide a dc output, a series resonance circuit provided in series to current flowing from the output terminal of the switching circuit, a parallel resonance circuit provided in parallel to voltage produced at the output terminal of the switching circuit, and a switching control circuit for intermittently turning on the switching elements of the switching circuit. A dc output is taken out of resonance current of the series resonance circuit by the dc output circuit and potential at the output terminal of the switching circuit is converted from one potential to another by using parallel resonance voltage of the parallel resonance circuit, whereby all switching operations of the switching elements are performed substantially at a voltage zero state or substantially at a current zero state and harmonic contents in operation voltage and operation current in the circuit are reduced.

11 Claims, 9 Drawing Sheets

POWER SUPPLY CIRCUIT

This is a continuation of application Ser. No. 07/896,214 filed on Jun. 10, 1992 now abandoned.

BACKGROUND OF THE INVENTION

This invention relates to a power supply circuit of a switching inverter type and, more particularly, to a power supply circuit of this type capable of reducing switching loss to the maximum and improving conversion efficiency by utilizing both voltage resonance and current resonance as well as reducing noise by enabling operation waveforms of voltage and current appearing at respective component parts of the circuit to simulate a sine wave to a maximum degree.

Conventional power supply circuits are designed normally by using a large power transformer, connecting an AC power source to its primary winding and smoothing its secondary output by rectification. There is also a small, light and highly efficient conventional power supply circuit called a switching power supply source. In this type of power supply circuit, there is a switching inverter type power supply circuit of a half bridge type, a full bridge type or a push-pull type using switching elements which alternately turn on and off (e.g., transistors, thyristors or MOS-FETs). In the switching inverter type power supply circuit, operation voltage and operation current are both of a square waveform and this poses a problem of generation of noise. Besides, since this type of power circuit operates fundamentally in a high frequency, there arises a problem of heat generation due to loss caused by the fact that recovery time of a rectifying diode and off time of switching transistors are of a limited value.

In the switching inverter type power supply circuit, there has recently been made an attempt to reduce generation of higher harmonics, reduce noise and reduce also loss in circuit elements by causing either a current or voltage waveform to simulate a sine wave by utilizing resonance.

In the resonance type switching power supply circuit, however, on-off timing of switching elements, i.e., timing in which each switching element is turned on or turned off, the circuit must be accurately set and if setting of the timing is incomplete, improvement of efficiency cannot be hoped for. Therefore, it sometimes becomes necessary to detect a current in the circuit for determining the timing with resulting necessity for a complex circuit design. Moreover, in the resonance type switching power supply circuit, resonance is mostly used for causing either current or voltage to approximate a sine wave. Since noise in the resonance type circuit is generated by both voltage and current, the conventional resonance type power circuit is incomplete in the noise reduction.

It is, therefore, an object of the invention to provide a resonance type power supply circuit of a high efficiency and low noise with a simple circuit construction.

SUMMARY OF THE INVENTION

A power circuit achieving the object of the invention comprises a dc power source, switching means including switching elements capable of switching an input from the dc power source to convert the input to ac and outputting ac from an output terminal thereof, the ac changing between two,different potentials, series resonance means provided in series to current flowing from the output terminal of the switching means, the series resonance means being capable of generating resonance current, parallel resonance means provided in parallel to voltage produced at the output terminal of the switching means, the parallel resonance means being capable of generating resonance voltage and potential at the output terminal of the switching means being converted from one of the two different potentials to the other by using the parallel resonance voltage of the parallel resonance means, switching control means for controlling the switching elements of the switching means so as to intermittently turn on the switching elements, and dc output means for full-wave rectifying and smoothing a supplied ac input, the dc output means being capable of taking out a dc output from the resonance current of the series resonance means, whereby all switching operations of the switching elements of the switching means are performed substantially at a voltage zero state or substantially at a current zero state and harmonic contents in operation voltage and operation current in the power supply circuit are reduced.

According to the invention, all switching operations of the switching elements are performed either at a voltage zero or a current zero state and, therefore, a switching loss becomes nearly zero and the efficiency of the circuit as a whole is improved nearly to a theoretic limit except for loss in a rectifying element. The loss in a rectifying element is inevitable in this type of circuit but even this loss can be neglected when the output voltage of the power circuit is relatively high. Moreover, both series resonance current and parallel resonance voltage are both of a spectrum which resembles one of a single frequency and, therefore, possibility of generation of ringing or overshoot due to buffering with resonance dip occurring in respective component parts of the circuit is reduced. Accordingly, unnecessary radiation such as harmonic contents is remarkably reduced. Alternatively stated, by causing both current and voltage waveforms to approximate a sine wave by using resonance, noise is reduced and switching loss is also reduced. The on-off timing of a switching transistor may be a fixed timing and the circuit design therefore may be facilitated and the power circuit as a whole can be designed in a simple manner.

An embodiment of the invention will now be described with reference to the accompanying drawings.

BRIEF DESCRIPTION OF THE DRAWINGS

In the accompanying drawings.

3

DESCRIPTION OF PREFERRED EMBODIMENTS

Figure 1:
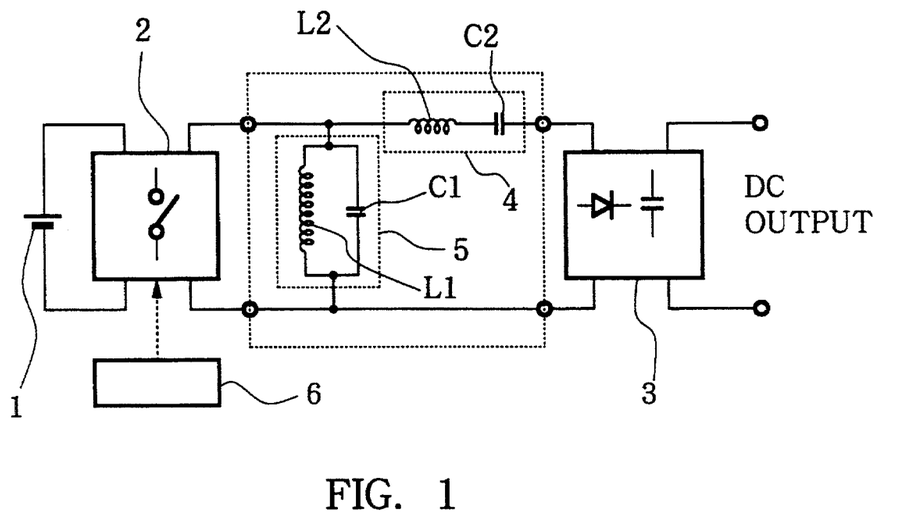
FIG. 1 is a block diagram showing schematically a basic principle of the invention.

FIG. 1 is the block diagram showing the basic principle of the power supply circuit according to the invention.

This power supply circuit includes a dc power source 1, switching means 2 including switching elements which are turned on and off at desired timing, switching a dc input from the dc power source 1 to convert it to ac and providing it as an ac output from an output terminal thereof, dc output means 3 which full-wave rectifies and smoothes a supplied ac input to provide a dc output, series resonance means 4 provided in series to current flowing, from the output terminal of the switching means 2, parallel resonance means 5 provided in parallel to voltage produced at the output terminal of the switching means 2, and switching control means 6 which controls the switching elements of the switching means 2 so that the switching elements turn on respectively intermittently.

Figure 2:
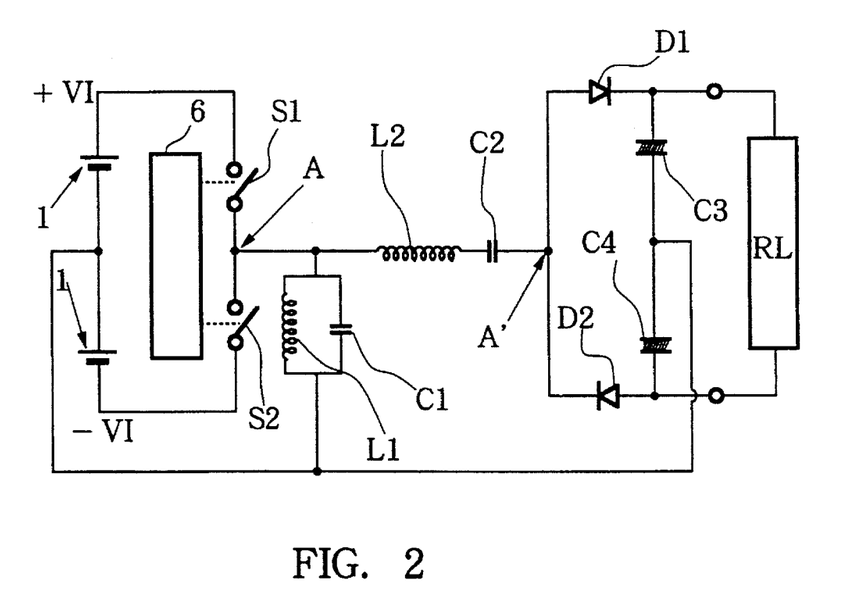
FIG. 2 is a circuit diagram showing a basic construction of the circuit according to the invention.

FIG. 2 is a circuit diagram showing the basic construction of the power circuit of the invention shown in FIG. 1 somewhat more specifically. The operation of the basic construction of FIG. 2 will be described with reference to the flow chart of FIG. 3.

Figure 3:
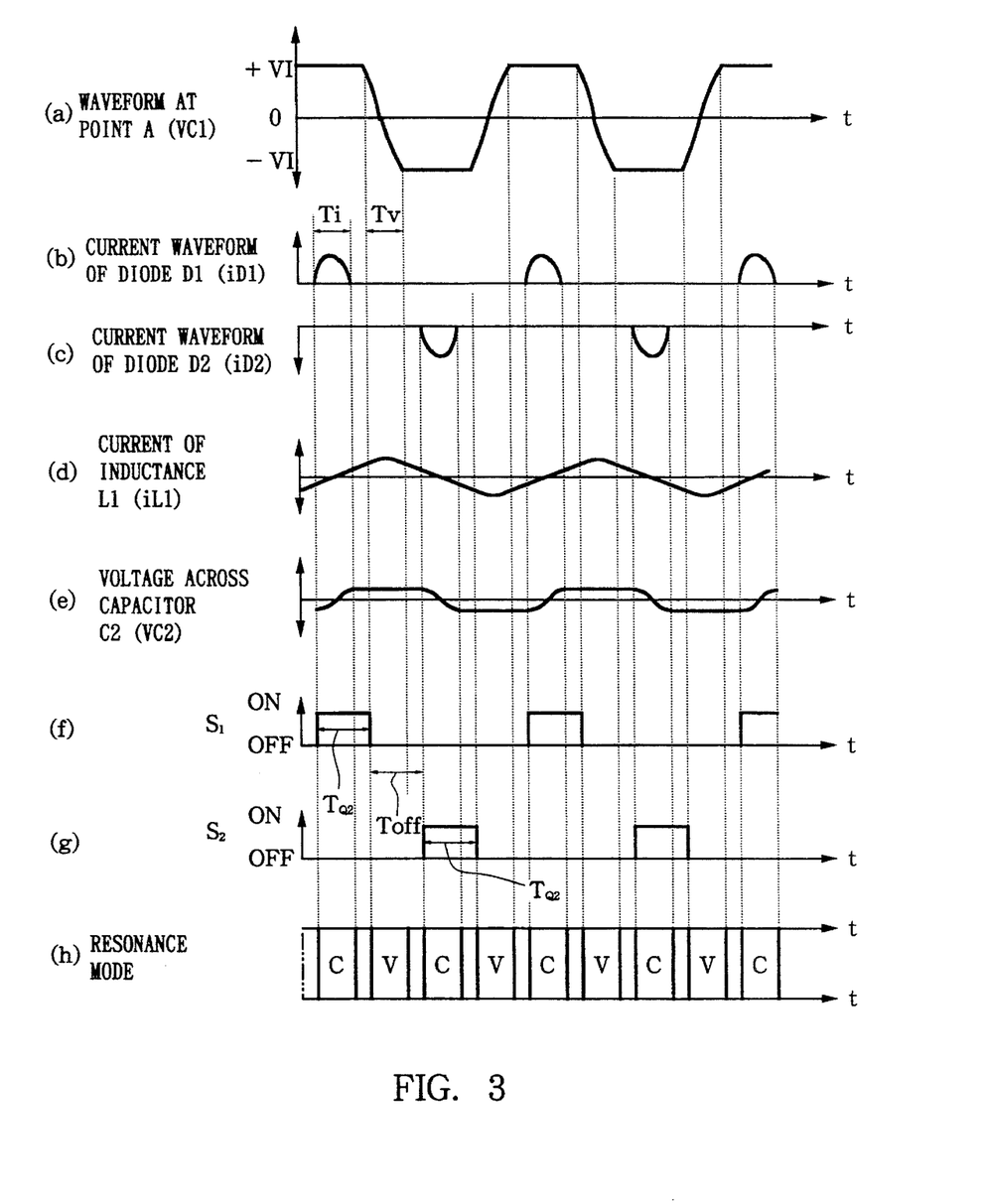
FIG. 3 is a timing chart for explaining operation of the basic construction of FIG. 2.

When switching elements S1 and S2 are being turned on and off repeatedly at a timing shown in (f) and (g) of FIG. 3, power source voltages +VI, −VI are converted into ac having substantially a peak value of VI at a point A of the circuit of FIG. 2. This ac is rectified by diodes D1 and D2 through an inductance L2 and a capacitor C2. The rectified signal is smoothed by capacitors C3 and C4 to become dc and the dc current flows through a load RL. For the diodes D1 and D2 and the capacitors C3 and C4, elements of substantially the same characteristics are used.

When the switching element S1 is in the on state, the diode D1 is in a forward direction so that charge current iD1 flows to the capacitor C3. Since the capacitor C3 is much larger than the capacitor C2 (C3>>C2) and impedances of the switching element S1 and the diode D1 are sufficiently small, this current iD1 becomes series resonance current of a sine waveform due to the inductance L2 and the capacitor C2 (see (b) of FIG. 3). Since reverse voltage is applied to the diode D1 and the diode D1 is turned off when the direction of reverse current is reversed upon lapse of each half cycle,

4 series resonance is stopped. In other words, when the resonance current has finished its half cycle has become zero, the resonance is automatically stopped.

At this time, charge corresponding to the resonance current which has flown to this time point has been accumulated in the capacitor C2 and voltage VC2 across the capacitor C2 remains (see (e) of FIG. 3). Since this charge QC2=C2·VC2 is discharged to the load during a next cycle during which the switching element S2 is in the on state and, therefore, there is no energy loss. Since energy stored in inductance is proportional to current flowing through the inductances, energy stored in the inductance L2 is zero when the resonance has stopped at the current zero state. This signifies that generation of harmful noise in this circuit portion is very small and also signifies an important condition under which a voltage resonance mode is established.

In order to reduce the magnetic energy of the inductance L2 completely to zero, it is necessary to keep the switching element S1 in the on state until the resonance current has become zero. It will be no use to keep the switching element S1 in the on state after the resonance current has become zero but it will be inefficient to simply prolong a time period during which energy is not transmitted. The switching element S1 therefore may be turned off with some allowance of time (TQ1−Ti). Since the resonance time (a cycle of resonance current) by the inductance L2 and the capacitor C2 is constant, a time period during which the switching element S1 is in the on state may also be a constant value.

When the switching element S1 is turned off, the current resonance has already finished and the current becomes zero and, therefore, current flowing through the switching element S1 at this time is only current flowing to the inductance L1. The value of the inductance L1 can be set independently from the values of the inductance L2 and the capacitor C2 and, by establishing a relation that inductance L1 is much larger than inductance L2 (L1>>L2), current flowing through the inductance L1 can be of a value sufficiently smaller than the resonance current of the inductance L2 and the capacitor C2 and, therefore, the switching element S1 is turned off in a nearly zero current state and, as a result, loss in turning off of the switching element S1 is extremely small. When the switching element S1 is turned off (since the switching element S2 has not been turned on, both switching elements S1 and S2 are off), the diodes D1 and D2 are also off and, therefore, the elements which are in electric operation at this time are only the inductance L1 and the capacitor C1.

Magnetic energy (current) stored in the inductance L1 during the on state of the switching element S1 constitutes energy which operates parallel resonance with the capacitor C1 which causes voltage at the point A to drop in a sine wave form and approach the potential −VI exceeding the zero point. The operation performed during this time period is the voltage resonance mode. The voltage resonance waveform in principle assumes a form as shown in (a) of FIG. 3 which is a vertically symmetrical form with respect to a point crossing the reference potential (i.e., the potential designated by "0" in (a) of FIG. 3). Depending, however, upon an actual circuit design, deformation will take place (e.g., a case where a timing control circuit to be described later consumes a part of energy of voltage resonance through its windings).

When the potential at the point A has dropped to nearly −VI (i.e., below the potential at one end of capacitor C4), the diode D2 is turned on and thereby causes energy charged in the capacitor C4 to discharge to inductance L1 through the diode D2, the capacitor C2 and the inductance L2. Since the current flowing through the inductance L1 is set to a small value, a large change in the current value does not take place but the potential at the point A remains at a value near −VI. If the switching elements S1 and 82 are kept in the off state, the magnetic energy (current) of the inductance L1 will be reduced to zero in a time length which is about half of the time period during which the switching element S1 is on and voltage across the inductance L1 (or capacitor C1) drops from the potential near −VI to zero. Alternatively stated, since the point A can be held at the potential near −VI by the magnetic energy of the inductance L1 during about half of the time period during which the switching element S1 is on, if the switching element S2 is turned on within this time period, it can perform a switching-on operation in a state where voltage across the switching element S2 is extremely small. Loss during the switching-on of the switching element S2 therefore is extremely small.

The voltage across the switching element S2 when it is turned on (i.e., difference between the above described potential near −VI and −VI) is exactly not zero but there exists voltage due to Vc2 (which is voltage across the capacitor C2) left after the current resonance during the on state of the switching element S1. The voltage Vc2 becomes a different value depending upon the value of the capacitor C2. Since the value of C2 can be set with a relatively large degree of freedom in relation to the inductance L2 and loss is generally smaller when the value of C2 is large and the value of L2 is small within a range in which series resonance can take place, the value of voltage VC2 consequently becomes small which can be almost neglected as compared with the voltage VI.

Upon turning on of the switching element S2, current resonance on the negative side takes place with a result that charge current flows to the capacitor C4. Subsequently, as shown in FIG. 3, the above operation is repeated with the switching elements S1 and S2 taking their place in turn.

Time between turning off of the switching element S1 and turning on of the switching element S2 may be set at a slightly longer time length than a time period during which the point A reaches the potential near −VI due to the voltage resonance by the inductance L1 and capacitor C1 after turning off of the switching element S1. It will be inefficient as well to take a longer time. This time period need not be set so strictly but a certain fixed value may be used.

Some more consideration will be given for the time period during which the switching elements S1 or S2 is on and the time period from turning off of the switching element S1 or S2 till turning on of the switching element S2 or S1. It may be basically said that the on period of each switching element should be set to a longer period than half cycle of resonance of the series resonance means and the off period of both switching elements should be set to a shorter period than half of the resonance period of the parallel resonance means. In this case, consideration should however be given to the amount of energy which is previously given to the voltage resonance circuit of the inductance L1 and the capacitor C1 before starting the voltage resonance mode. Consideration should also be given to the manner of determining values of the inductance L1 and the capacitor C1 even when the parallel resonance frequency is set at a certain value. The on period of each switching element determines the amount of the given energy and the off-period of both switching elements should be limited to determine by the given energy (i.e., the value corresponding to the on period). According to analysis made by the inventor, it has been found that, in actuality, once the on period and the off period have been determined, the switching frequency is determined at this time and the parallel resonance (voltage resonance) frequency satisfying the operation of this invention and a usable portion of the parallel resonance waveform are solely determined. When, for example, the on period is set infinitely small (substantial zero), the voltage resonance waveform in this case seems to change substantially in the shape of a sine waveform with substantially the same frequency as the switching frequency. It should be noted, however, that, in some cases, a desired output terminal voltage change of 2VI is not realized notwithstanding that the voltage resonance has reached its peak value.

Further, as will be apparent from the above description, it is desirable that there should be the relations L1>>L2 and C2>>C1 as condition for setting the values of the respective resonance circuits. The rectification should be made by the full-wave rectification system. As the smoothing system, a capacitor input system should be used for the current resonance. The capacity of the smoothing capacitors C3 and C4 should be much larger than the capacitor used in the series resonance means 4 so as to prevent decrease in Q of the current resonance.

Some practical aspects, of the power supply circuit designed in accordance with the above described basic principle will now be considered. Determination of output voltage in the basic construction shown in FIG. 2 will first be described. The illustrated basic construction has no voltage conversion means such as a transformer and therefore may seem to be incapable of adjusting the output voltage. However, by constructing the output rectifying circuit as a voltage multiplier having voltage which is double or more the input voltage, the output voltage changes in an integer multiple relation with the input voltage. Alternatively, by using the inductance of the parallel resonance means as a transformer for self inductance, a desired voltage output can be obtained. More specifically, by providing an intermediate tap at a desired position in the winding of the element such as a transformer which constitutes the inductance L1 and connecting the output terminal of the switching circuit and one terminal on the side of the switching circuit of the series resonance circuit between necessary terminals, a desired voltage output can be obtained. Thus, the circuit shown in FIG. 1 or FIG. 2 has a considerable degree of freedom as to the output voltage.

Description will now be made about an isolation function between input and output. This type of power supply circuit generally has, as one of its functions, a function of isolating the primary side of the power supply circuit from the secondary side thereof. In the basic construction of FIGS. 1 and 2, this function is not disclosed. According to a more specific construction using an intermediate transformer to be described later, however, such isolation function is performed.

Output regulation against load variation in this power supply circuit will now be described. In the basic construction shown in FIG. 1 or FIG. 2, there is no particular constant voltage function disclosed. This is because one of contemplated applications of the power supply circuit of the invention is a power supply circuit used for a power amplifier in an audio device. In such application of the power supply circuit, if a load which is extremely smaller than the rated load is connected to the output of the amplifier, an overpower will take place in the circuit with resulting occurrence of burning. For preventing such overpower, it is generally considered to be preferable not to provide constant voltage means at the output stage of the circuit. When this power supply circuit is used for applications other than audio devices or when constant voltage means is required for some reason in using the power supply circuit as a power source for an amplifier, such constant voltage means, may be additionally provided or suitable means such as a series regulator may be provided in the posterior stage of the power supply circuit. As to the basic load-power followability (i.e., a function according to which, when load current changes, the output voltage remains substantially constant and the output current only changes with the load current), the circuit of FIG. 1 or FIG. 2 has such function as in conventional power supply circuit using a transformer. More specifically, voltage drop in a capacitor for taking out the output is determined in response to the load current and voltage difference V caused by this voltage drop is applied to impedance Z across the series resonance means (this impedance is theoretically zero but actually is a finite small value) and, as a result, series resonance current which is determined substantially by V/Z flows. Therefore, when a large power is consumed, the resonance current is large and when a small power is consumed, the resonance current is small.

In realizing the above described basic construction as a specific circuit, as will be apparent from the above described principle, the relations L1>>L2 and C2 C1 are desirable as actual condition for setting values of the respective resonance circuits. For satisfying these relations, primary self inductance of the transformer is effectively used as L1, an independent inductance or leakage inductance between the primary and the secondary of the transformer is used as L2. Since the rectifying circuit is positioned on the secondary side of the transformer, either a center tap type rectifying circuit or a bridge type one may be used. In any case, it must be a full-wave rectifying circuit because the current resonance must be performed with both positive and negative currents. As the smoothing circuit, a capacitor input type circuit is used for the current resonance and the relation C3>>C2 is maintained so as to prevent drop of Q (quality) factor in the current resonance.

Figure 4:
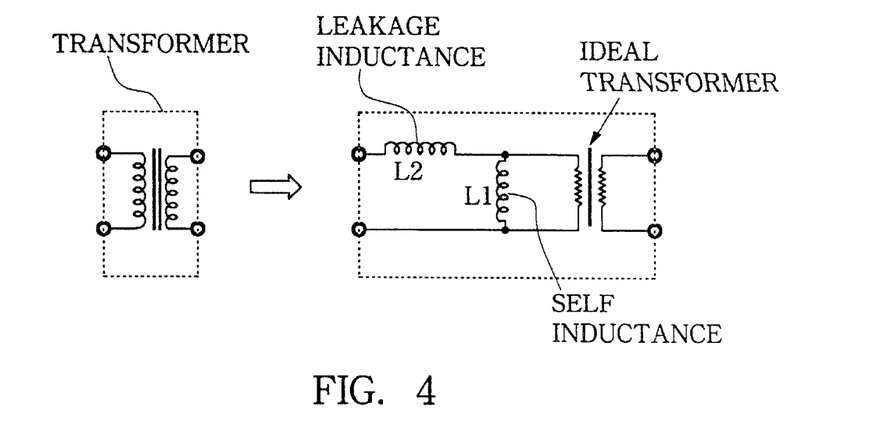
FIG. 4 is a diagram for explaining an equivalent circuit of a transformer.

The transformer viewed from the primary side is shown in FIG. 4. Since the transformer has self inductance and leakage inductance, these inductances may be utilized as L1 and L2 of FIG. 2 by properly setting the values of these inductances in the circuit design. In a general transformer, the relation L1>L2 is satisfied.

Figure 5:
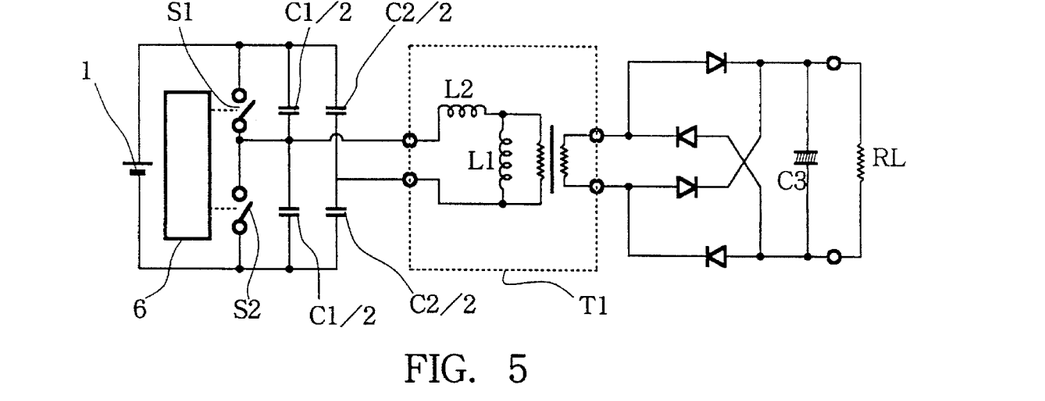
FIG. 5 is a circuit diagram showing a modified example of the basic construction of FIG. 2.

The basic circuit of FIG. 2 can be modified in the form shown in FIG. 5. In FIG. 5, the current resonance is performed by the inductance L2 and the capacitor C2 which is divided in two capacitors whereas the voltage resonance is performed by the inductance L1 and the capacitor C1 which is divided in two capacitors and the inductance L1. The circuit of FIG. 5 may seem to be different from the circuit of FIG. 2 in that the loop of the voltage resonance includes both the inductance L2 and the capacitor C2 but since there are the relations L2<<L1 and C2>>C1, the presence of L2 and C2 does not substantially affect the voltage resonance and, accordingly, the voltage resonance is virtually performed by the capacitor C1 and the inductance L1 in the same manner as in the circuit of FIG. 2.

Figure 6:
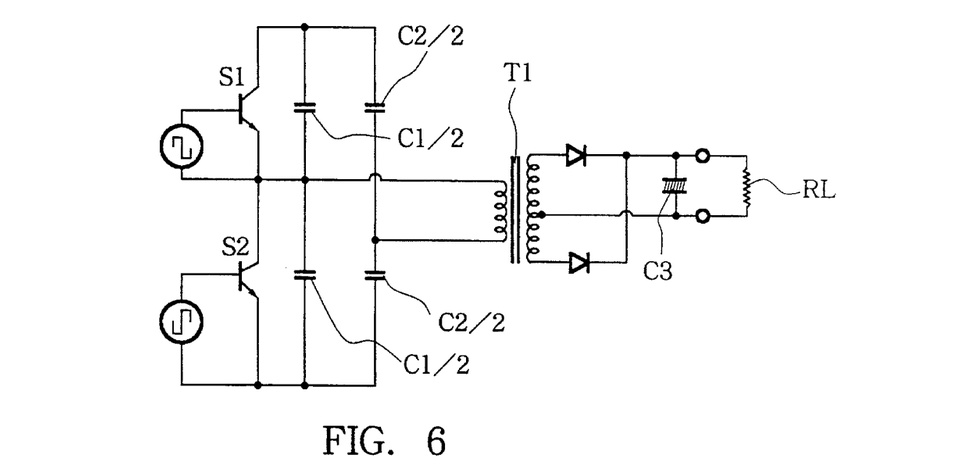
FIG. 6 is a circuit diagram showing an embodiment which is a modified form of the basic construction of FIG. 2.

FIG. 6 shows a more specific circuit using a transformer T1 having self inductance L1 and leakage inductance L2. The center tap type output circuit is used as the output circuit. The center tap winding is adopted because the number of diodes in the rectifying path in each rectifying cycle thereby can be reduced and, as a result, loss due to these diodes can be held to the minimum and efficiency of the circuit as a whole can be improved. Further, two transistors are utilized as the switching elements S1 and S2. Each transistor is switched by a driving circuit having a fixed switching timing as shown in (f) and (g) of FIG. 3. Accordingly, a power supply circuit with low noise and high efficiency can be realized by a simple construction.

Benefits derived from the above described power supply circuit are summarized as follows:

First, as an advantageous result of the current resonance, noise due to current is reduced. The current noise is produced in a large amount particularly when an abrupt change in current takes place in a portion where a large current flows. The current resonance automatically stops when the current which changes in the shape of a sine wave has been reduced to zero and, therefore, very little noise is generated. As to the improvement of efficiency, the switching elements S1 and S2 are turned off at the current zero state and voltage through the diodes D1 and D2 is also reversed after the current has been reduced to zero, so that the adverse effect to the efficiency during the recovery time is reduced.

Advantageous results of the voltage resonance also are reduction of noise and improvement of efficiency of the circuit as a whole. Since parts such as semiconductors used in the power supply circuit are mounted on a chassis through an insulating material for heat radiation, part electrode and the chassis have electrostatic capacity. The part electrode is provided with an ac signal and, accordingly, current flows this capacity which becomes a main cause of a common mode noise. The semiconductors have also a junction capacity and the inductances and transformer also have line capacity. These capacities do not appear in the circuit diagram but actually exist in the respective parts and the circuit board and, therefore, current flows to all these capacities when the circuit is in operation. Since this current is one flowing to the capacity, it becomes larger when change in the voltage (dV/dT, i.e., ratio of change in voltage V to time T) is larger. When switching is made with a square wave, this current becomes a pulse-like current and generates a current noise. Current flowing to the chassis causes a pulse-like common mode noise. Since this pulse-like current is supplied to the switching transistors, loss in the switching transistors is produced with resulting decrease in the efficiency. Besides, since voltage having a large dV/dT contains a high frequency component, a radio wave radiated directly from the circuit (unnecessary radiation) also becomes large.

By using the voltage resonance using a waveform approximating a sine wave and reducing dV/dT, these problems can be overcome. According to the invention, the voltage resonance is performed by the inductance L1 and the capacitor C1 only when both the switching elements S1 and S2 are both on and, therefore, loss in the switching elements S1 and S2 is not produced. The current flowing through the inductance L1 and the capacitor C1 is mere transfer of mutual energy so that only reactive power is consumed and loss due to the voltage resonance is very small (theoretically zero).

For reducing a voltage type noise, it is important that dV/dT of voltage waveforms at all terminals of the circuit is neglibly small. If there is a square wave at one terminal only, it will become a noise source. Power circuits of a conventional voltage resonance type mostly contain square waves (e.g., in the transformer output), though they have a sine wave at one spot in the circuit. It is a final object of this invention to realize a practical low-noise power circuit (with respect to an external circuit portion) and it is a feature of the invention that all voltage waveforms are similar to the voltage resonance waveform by the inductance L1 and the capacitor C1. This is achieved by performing the voltage resonance at a different time from the current resonance, That is, after reducing currents of the switching elements S1 and S2 and the diode D2 to zero and reducing also the magnetic energy of the inductance L2 to zero and by the current resonance, the voltage resonance is started and, by bringing the switching elements S1 and S2 and the diodes D1 and D2 in an off state and thereby reducing current in the inductance L2 and the capacitor C2 in the voltage resonance mode to zero, the waveform at the point A and the waveform at the point A' become similar to each other. The terminal voltage waveforms of the inductance L1 and the capacitor C1 thereby become similar to the terminal waveforms of the switching elements S1 and S2, inductance L2, capacitor C2, and diodes D1 and D2 and a square wave disappears from the circuit.

Description will now be made about the timing control means for controlling the switching timing of the switching elements S1 and S2.

The circuit which constitutes the base of the timing control circuit used in the invention will be described with reference to FIG. 7. This circuit is disclosed in the Japanese Patent Publication No. Hei 3-1914. The operation for timing control is performed in the following manner: Upon application of an ON voltage by a winding 21 or 22, a main switching transistor 25 or 26 is turned on by resistance 23 or 24 and then, by turning on of an auxiliary switching transistor 29 or 30 by a time constant circuit 27 or 28 after lapse of a certain time period, the main switching transistor 25 or 26 is turned off. A circuit constituting the timing control means of the power supply circuit of the present invention constructed by using the above described timing control circuit as its basis is shown in FIG. 8.

Figure 7:
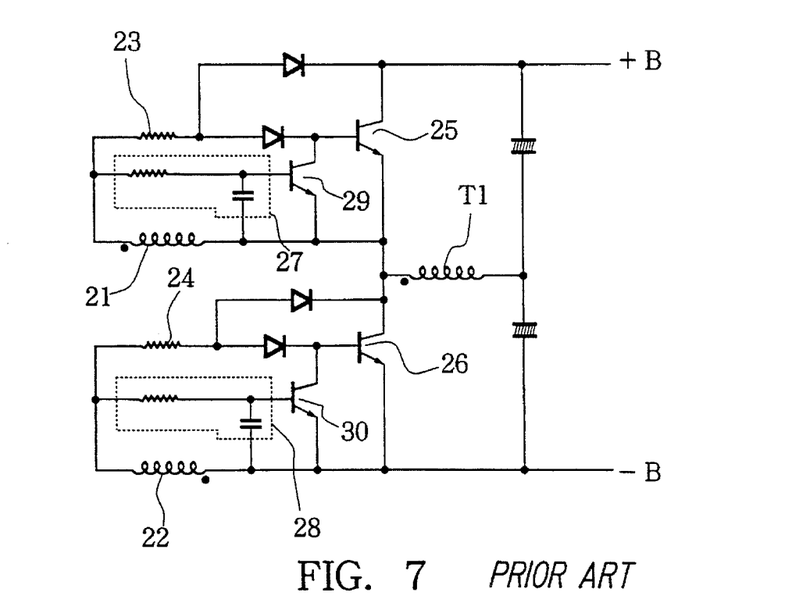
FIG. 7 is a circuit diagram showing a prior art circuit which constitutes a base of the timing control means in the embodiment of the invention.
Figure 8:
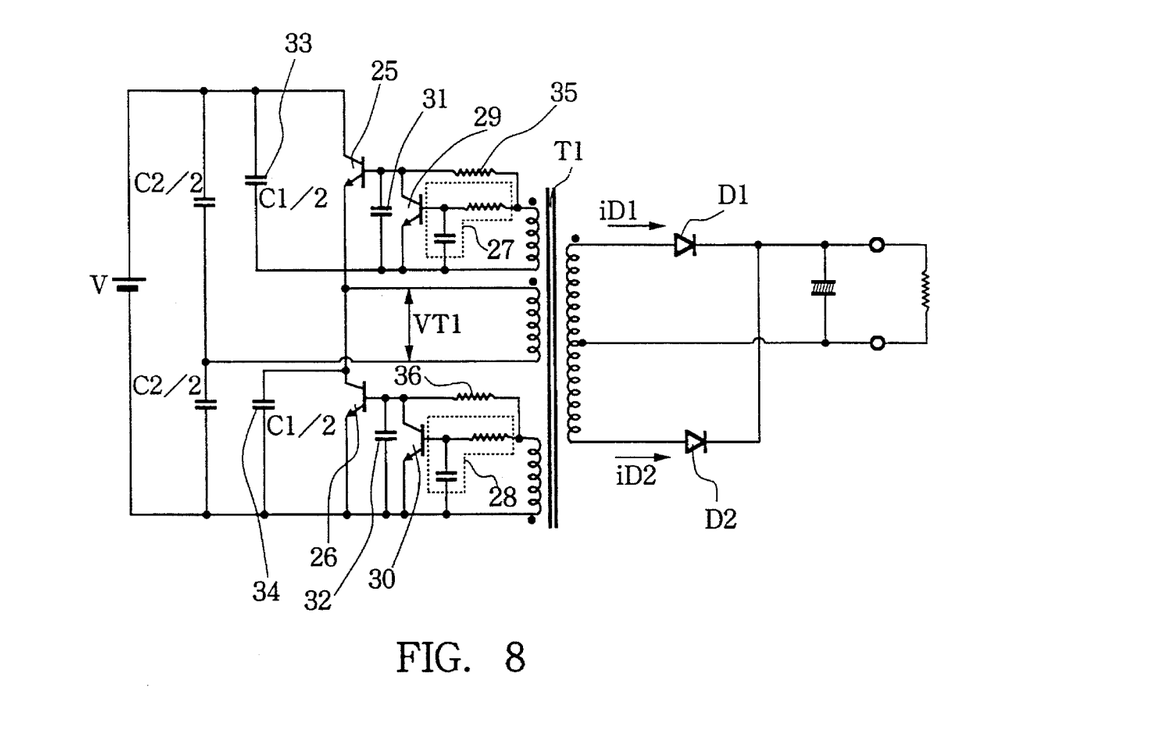
FIG. 8 is a circuit diagram showing the timing control circuit in the embodiment of the invention.

In FIG. 8, capacitors 31 and 32 which are not provided in the circuit of FIG. 7 are necessary in the circuit of this embodiment of the invention. The object of control in the circuit of FIG. 7 is basically an inverter circuit using a square wave. That is to say, when current is cut off by turning off of the main switching transistor 25 or 26, voltage of the transformer T1 is instantaneously inverted by self inductance (L1) and leakage inductance (L2) of the transformer T1 and, accordingly, the main switching transistor 26 or 25 may be instantly turned on by utilizing this voltage (i.e., by feedback winding).

More specifically, since the circuit of FIG. 7 is not a current resonance type circuit, the leakage inductance (L2) of the transformer T1 is not utilized. The leakage inductance of the transformer T1 however cannot be reduced to zero and a certain value of leakage inductance exists. When the main switching transistor 25 or 26 has been turned off, current is flowing through the leakage inductance L2 and, in the case of the circuit of FIG. 7, the tendency to causing the current to flow continuously causes voltage to be inverted with a spike. Thus, switching is performed with a waveform having a very large dV/dT. Since the leakage inductance does not serve for any purpose in a square wave switching inverter, the transformer T1 is designed so as to reduce it to the maximum extent possible. Besides, since the leakage inductance is not zero, if, in the circuit of FIG. 7, the current resonance was not made but capacitors 33 and 34 corresponding to the parallel resonance capacitor C1 were added to perform voltage resonance with the self inductance L1 of the transformer T1 thereby to reduce dV/dT of the waveform being switched, the switching would be made while the current is flowing through the leakage inductance L2 and, accordingly, the waveform would be determined by the current of L2 which is much larger than the current flowing through the self inductance L1 and, as a result, generation of the spike like voltage would be inevitable.

Figure 9:
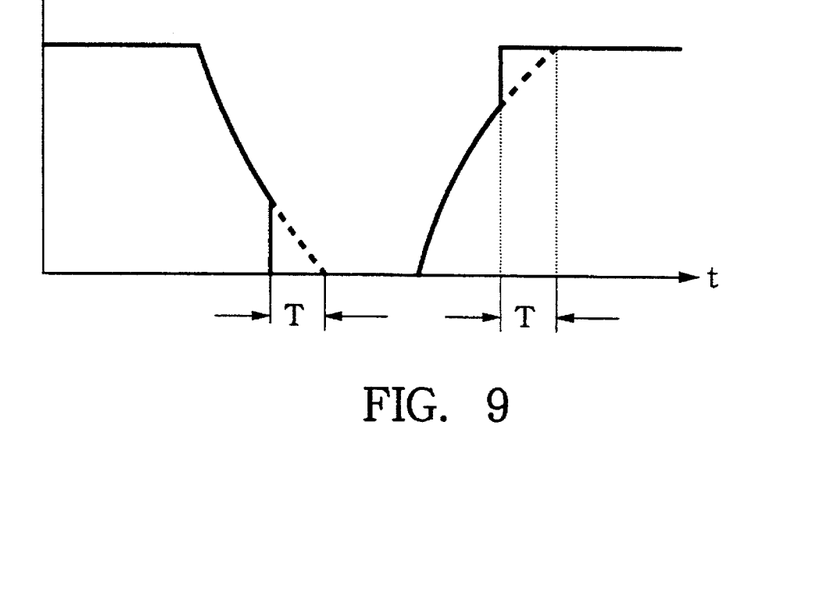
FIG. 9 is a waveform diagram for explaining a problem of the prior art circuit of FIG. 7.
Figure 10:
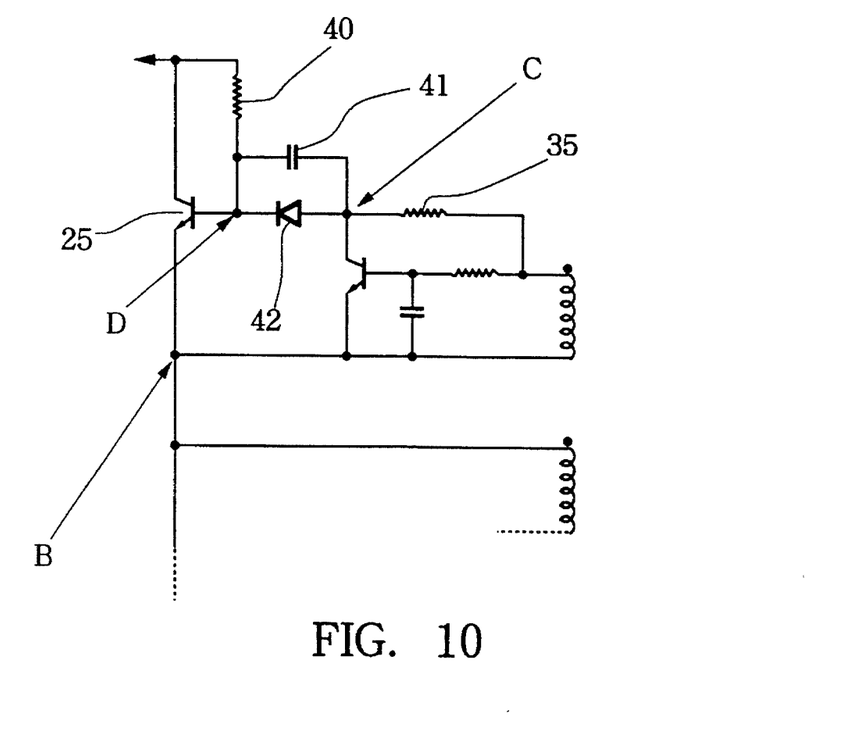
FIG. 10 is a circuit diagram showing a circuit for starting the timing control means.

In the present invention, when the main switching transistor 25 has been turned off, the voltage resonance mode is brought about and when the resonance waveform has reduced the voltage of the main switching transistor 26 substantially to zero, it is necessary to turn on the main switching transistor 26. In the circuit of FIG. 7 in which no capacitors 32 and 33 are provided, the main switching transistor 26 is instantly turned on at a voltage at which voltage of the feedback winding causes the main switching transistor 26 to turn on. This causes the waveform to be deformed when the voltage resonance mode has passed about its middle point as shown in FIG. 9 with the result that the waveform becomes one of a large dV/dT. For preventing this, the capacitors 31 and 32 are added and turning on of the main switching transistor is delayed by time T in FIG. 9 by time constant formed by the capacitors 31 and 32 and resistances 35 and 36 and a voltage resonance waveform as shown by the dotted line thereby is obtained. Relations between the on-off timing of the main switching transistors 25 and 26 and V, I and iD2 are the same as those shown in (f), (g), (a), (b) and (c) of FIG. 3. Respective time periods T, Toff, Ti and Tv shown in FIG. 3 are set in such a manner that relations of TQ1≧Ti and Toff≧Tv are satisfied The circuit of FIG. 8 includes all necessary elements for the operation of this circuit but this circuit cannot start by itself in this state. Starting of the circuit can be accomplished by applying a shot of pulse to this circuit from a separate circuit but, in this embodiment, a circuit shown in FIG. 10 is used. This circuit can realize starting of the power circuit with a relatively small number of component parts. FIG. 10 shows a portion of the circuit of FIG. 8 about the main switching transistor 25.

Starting Circuit

In FIG. 10, resistance 40, a capacitor 41 and a diode 42 are added to the base circuit of the main switching transistor 25. The resistance 40 is of a high resistance value because it must cope with a power loss and capacity of the capacitor 41 is made large for achieving strong starting. When the power is turned on, the winding voltage of the transformer is zero and charge of the capacitor 41 is also zero. Current flowing through the resistance 40 is very small. This current charges the capacitor 41, flows through the resistance 35 and the winding and reaches a point B but this current is not of such a magnitude as to produce a large potential difference across the resistance 35. Therefore, the points B, C and D are initially at substantially the same potential, so that the main switching transistor 25 is in the off state.

The capacitor 41 is charged with lapse of time and, when the potential difference between the points B and D has reached the base-emitter forward voltage of the main switching transistor 25, the transistor 25 enters an active region. At this time, a positive feedback loop from the positive feedback winding to the base of the transistor 25 through the resistance 35 and the capacitor 41 is formed. The main switching transistor 25 is turned on acceleratedly by the positive feedback, being maintained in the on state by a large base current flowing from the winding through the resistance 35. Since the current flowing from the resistance 35 to the capacitor 41 at this time is much larger than current which is reversely charged from the resistance 40, the potential of the capacitor 41 becomes the forward potential of the diode 42 and, after starting, is fixed to this forward potential of the diode 42. Therefore, erroneous turning on of the main switching transistor 25 during the off timing thereof due to the resistance 40 can be prevented.

Duty Correction Operation

In the two transistor type switching power circuit to which this invention is applied, it is desirable that currents flowing through the two transistors which are turned on and off alternately and two rectifying diodes are of the same value. In the switching power supply circuit, however, winding resistance is of a very low value and, accordingly, while voltage loss is small, it is not possible to reduce imbalance between currents by utilizing the resistivity loss voltage. This poses a serious problem in a power circuit for a large power because resistance value of a current supply path is very small. When imbalance is produced between currents, the peak; value of the currents becomes large with resulting increase in heating of the semiconductors and transformer. As a result, the switching power supply circuit performs as if it was a single transistor power supply circuit and its efficiency is decreased to that of a single transistor power supply circuit. Thus, adoption of the two transistor power supply circuit would become meaningless.

Figure 11:
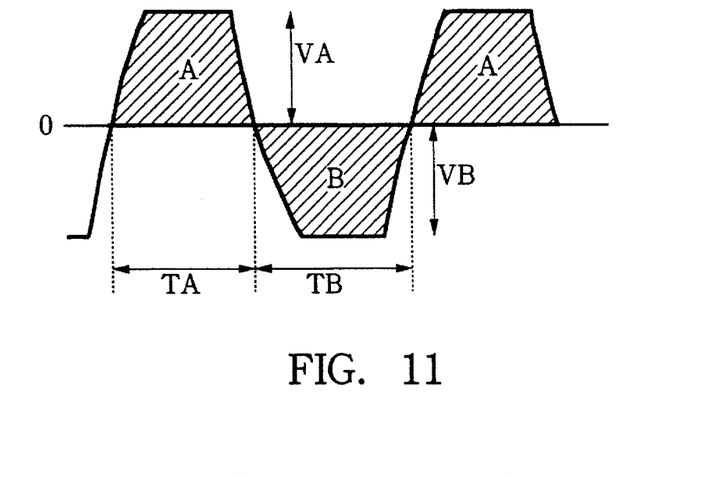
FIG. 11 is a waveform diagram showing duty factor correction in the timing control means of the above embodiment.

There are two causes for the current imbalance. One is imbalance caused by imbalance in induced voltage of the transformer. FIG. 11 shows a winding voltage of a transformer. Assume, for example, that the cycle during which the transistor 25 and the diode D1 in FIG. 8 are on is designated by A and the cycle during which the transistor 28 and the diode D2 are on is designated by B. Since the winding voltage of the transformer has no direct component, the area of the cycle A is the same the area of the cycle B. When there is no loss in the switching elements, voltage VA+VB becomes equal to the power voltage V in FIG. 8. For achieving VA=VB, however, relation TA=TB must be satisfied assuming that the waveforms A and B are of the same shape. This is because the transformer operates so as to equalize the area A with the area B and, therefore, VA becomes substantially equal to VB when TA is substantially equal to TB. This phenomenon is described in detail in the above mentioned Japanese Patent Publication No. Hei 3-1914. For this reason, for achieving VA=VB, it is necessary to drive the switching elements so that the relation TA=TB will be satisfied, i.e., the duty factor will become exactly 50%.

Another cause for the current imbalance is difference in loss voltage occurring in the current path between the cycle A and the cycle B. Since this loss is larger when current is larger, this loss hardly occurs in the voltage resonance mode and occurs in the current resonance mode. The current path in the cycle A is formed by the switching transistor 25, transformer T1, divided series resonance capacitor C2 and diode D1. The current path in the cycle B is formed by the switching transistor 26, transformer T1, divided series resonance capacitor C2 and diode D2. Both currents flow through the series resonance capacitor C2 and therefore there is no difference in the loss voltage. In the transformer T1, the two currents flow through the same winding in the primary but through different windings in the secondary. Therefore, when there is difference in resistance of the secondary windings, different loss voltages are produced. Difference in the on resistance value between the switching transistors 25 and 26 and difference in forward voltage between the diodes D1 and D2 constitute directly difference in the loss voltage. Particularly, the forward voltage of the diodes D1 and D2 is affected in such a manner that, when current imbalance on one side is produced, heat generation is increased and temperature thereby is raised and the forward voltage is decreased, resulting in decrease in loss voltage which accelerates the current imbalance.

When the power supply source is small power, loss voltage due to the winding resistance of the transformer is larger than loss voltage due to difference in the forward voltage between the diodes or difference in the on resistance between the switching transistors and, therefore, the effect due to the above described second cause of the current imbalance is not so conspicuous and the problem can be mostly solved by coping with the above described first cause, i.e., bringing about the duty factor of 50%. In the power supply circuit of this invention, loss is small and a considerably large output can be obtained. Expecting a case where this power circuit is used for obtaining a large output, the problem of the current imbalance due to the above described second cause should be solved.

Even when duty factor is exactly 50%, it is necessary for eliminating the current imbalance to establish relation VA−VLOSA=VB−VLOSB in FIG. 11, assuming that loss voltage in the cycle A is designated by VLOSA and loss voltage in the cycle B by VLOSB. Since, however, the loss voltage is not maintained at a constant value but it varies with, e.g., the current value and temperature, it is actually not possible to satisfy the above described relation using VA and VB as constant values. Since the ratio between VA and VB is determined by voltage duty factor, the duty factor should not be a fixed value but should be changed in accordance with change in the loss voltage for maintaining balance in currents.

For eliminating current imbalance with the duty factor being fixed to a constant value, the following two methods can be considered. One method is to adopt a voltage doubler system as the rectifying circuit on the secondary side. Voltage difference due to difference in the duty factor and loss voltage becomes difference in charge voltage in each capacitor. Since load current flows commonly from sum voltage of the respective capacitors, the amount of current flowing through each diode is the same.

The other method is to adopt the bridge rectifying system and insert a capacitor in series in the current path of the primary side of the transformer. Owing to existence of the serially inserted capacitor, current flowing from the winding of the transformer to the load becomes ac (not including DC offset current) in which amounts of positive and negative currents are equal to each other. This circuit therefore will not cause the current imbalance.

In these two circuits, current imbalance which will cause a practical problem will not be produced if voltage duty factor of approximately 50% is used. In these circuits, however, currents flow through two rectifying diodes to produce a single output voltage and there will be produced forward voltage loss for two diodes. The loss due to a rectifying diode generally is considered to be the greatest problem in a switching type power supply circuit. Doubling of this loss therefore poses a serious problem in the circuit design of the power supply circuit. Particularly, this causes a serious decrease in efficiency in a power supply circuit for providing a low voltage and large current output.

For reducing such loss, in switching type power supply circuits, the centre tap system (see FIG. 8) or, in the case of positive and negative power sources, the center tap bridge system is generally used as the rectifying system. In this case, there does not seem an effective method for preventing current imbalance on the secondary side. In a ease where the center tap system or the center tap bridge system has to be employed for improving efficiency, it becomes necessary, as described before, to maintain current balance by changing the duty factor. The previous description is intended to mean that, even when duty factor is exactly 50%, imbalance in loss voltage causes current imbalance. That is, an effort to obtain duty factor which is exactly 50% will not basically solve the problem of current imbalance. However, in the case of the present invention in which difference in a slight loss voltage taken up as a problem to be considered, duty factor providing a wave peak value which has only an error which is smaller than this small loss voltage must be exactly 50% and it is not an easy task to obtain this duty factor which is exactly 50%. Accordingly, when elimination of the current imbalance is considered on the condition that there is no difference in loss voltage, duty factor will have to be automatically controlled also so as to match the value of currents. By doing so, a state where duty factor of 50% is maintained can be realized.

As to the method for changing duty factor for maintaining balance between currents, the circuit of FIG. 7 has such function, though incompletely. In the circuit of FIG. 7, when load current is not provided from the secondary side, this circuit has no ability of correcting duty factor, that is, correcting duty factor to 50%. It is not wrong to think that it is preferable to have duty factor of 50% regardless whether there is load or not. This operation, however, in which duty factor is not fixed during absence of load is a part of the operation in which current balance is maintained automatically during presence of load. Alternatively stated, duty factor becomes unfixed because load is removed and current is reduced to zero from the circuit which has originally an ability (although not complete one) of operating while automatically adjusting duty factor so as to balance currents automatically. In the circuit of FIG. 7, duty factor really becomes approximately 50% when current is provided as the output. A design concept in the circuit of FIG. 7 is that this circuit operates at duty factor of 50% and some step should be taken to eliminate an instable state which will take place during absence of load. In actuality, an effort to maintain duty factor of a fixed value tends to leave current imbalance uncorrected. In the case of a power supply circuit in which power is not so large, the current imbalance is not so conspicuous. The method to be described below solves the problem in an opposite manner to the circuit of FIG. 7. This does not signify that the circuit of FIG. 7 is meaningless but the circuit of FIG. 7 as well as the method to be described below can be effective methods depending upon the capacity of power source, though the method to be described below is considered to solve the problem more basically and therefore is more effective.

Figure 12:
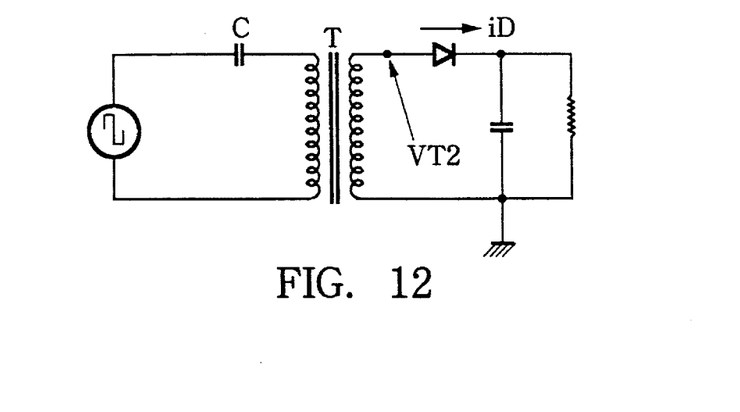
FIG. 12 is a circuit diagram showing a circuit for performing duty factor, correction in the above embodiment.
Figure 13:
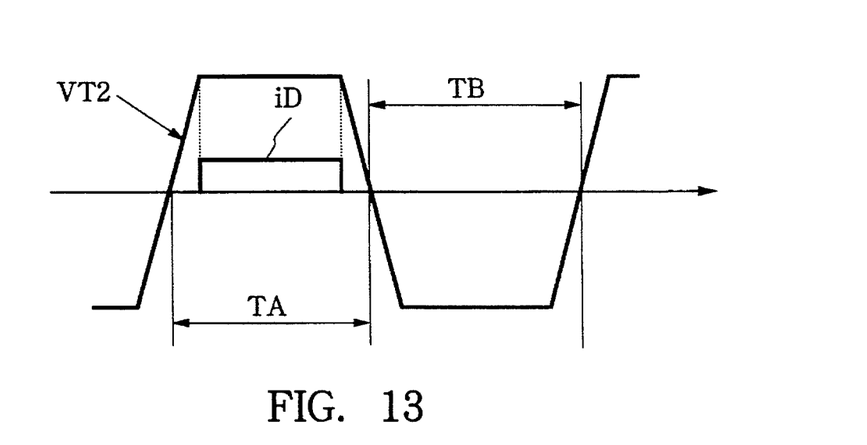
FIG. 13 is a waveform diagram showing duty factor correction in the timing control means in the above embodiment.

Assume now that, as shown in FIG. 12, load current has been provided from either one of positive and negative voltages (positive voltage in this example) of a secondary winding wave form VT2 of a transformer whose primary winding is driven by a signal source having a constant duty factor (50% in this example) through a capacitor. Waveforms are shown in FIG. 13. In FIG. 13, iD causes the positive voltage of VT2 to decrease. As described before, the area of positive voltage is the same as the area of negative voltage in the winding voltage of the transformer and, when the positive voltage of VT2 has dropped, a time period TA must be longer than a time period TB if the area of the positive voltage should remain equal to the area of the negative voltage. The current iD there fore causes the duty factor to change in such a manner that TA becomes longer and TB becomes shorter. When, however, the drive side is operating to maintain the constant duty (50%), the duty factor cannot change so that drop in VT2 remains to be a voltage drop corresponding to loss in the current path.

Figure 14:
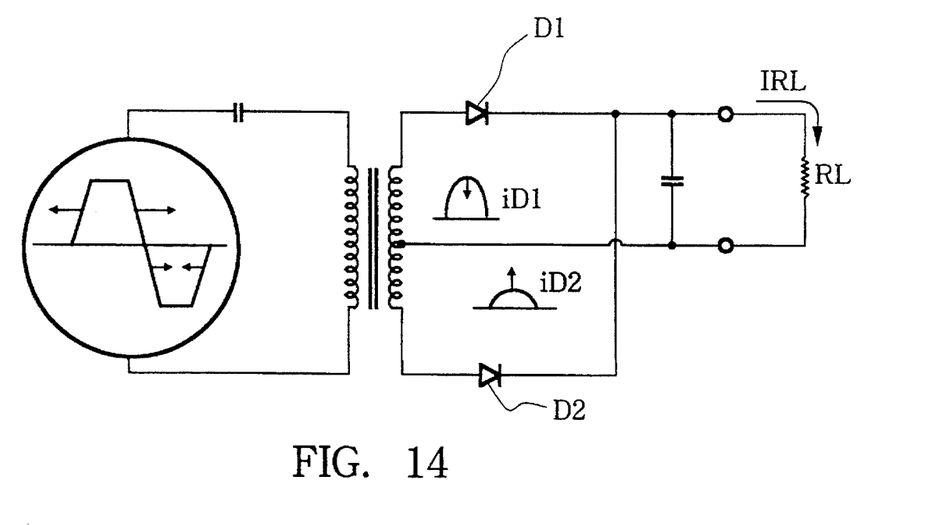
FIG. 14 is a waveform diagram showing duty factor correction in the timing control means in the above embodiment.

In a case where the drive signal source is oscillating at a constant frequency but has no ability of maintaining duty factor so that any duty factor can be adopted, flowing of iD causes decrease in the positive voltage and increase in TA and increase in the negative voltage and decrease in TB. The positive voltage decreases until iD finally becomes zero with an extremely imbalanced duty factor. In the case of the circuit of FIG. 12, iD becomes zero and output voltage disappears in the above described manner. Since an output current in the center tap type rectification is provided in both the positive and negative cycles, current flowing in one cycle side only corresponding to iD in FIG. 13 represents an imbalance portion of current itself. Thus, the current imbalance is eliminated and the duty factor is automatically adjusted to one at which the values of currents in the positive and negative cycles are the same. In a circuit using the center tap system also, by removing duty factor maintain ability of the drive signal source as shown in FIG. 14, the duty factor is automatically adjusted to one at which an imbalance current between iD1 and iD2 is reduced to zero.

The circuit of FIG. 7 cannot be said to have an ability of maintaining duty factor so that it has some effect of reducing the current imbalance. However, the ability of this circuit for maintaining the oscillation frequency at a constant frequency is not certain. In this circuit, therefore, the energy of the imbalance current to change the duty factor is not certain because it is consumed not only for change of the duty factor but also for change of the oscillation frequency.

Figure 15:
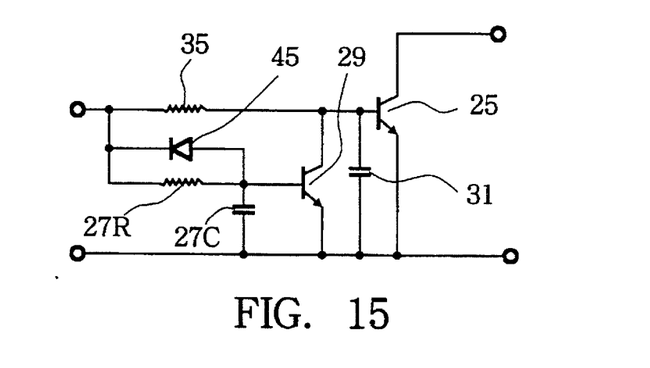
FIG. 15 is a circuit diagram for performing duty factor correction in the timing control means.
Figure 16:
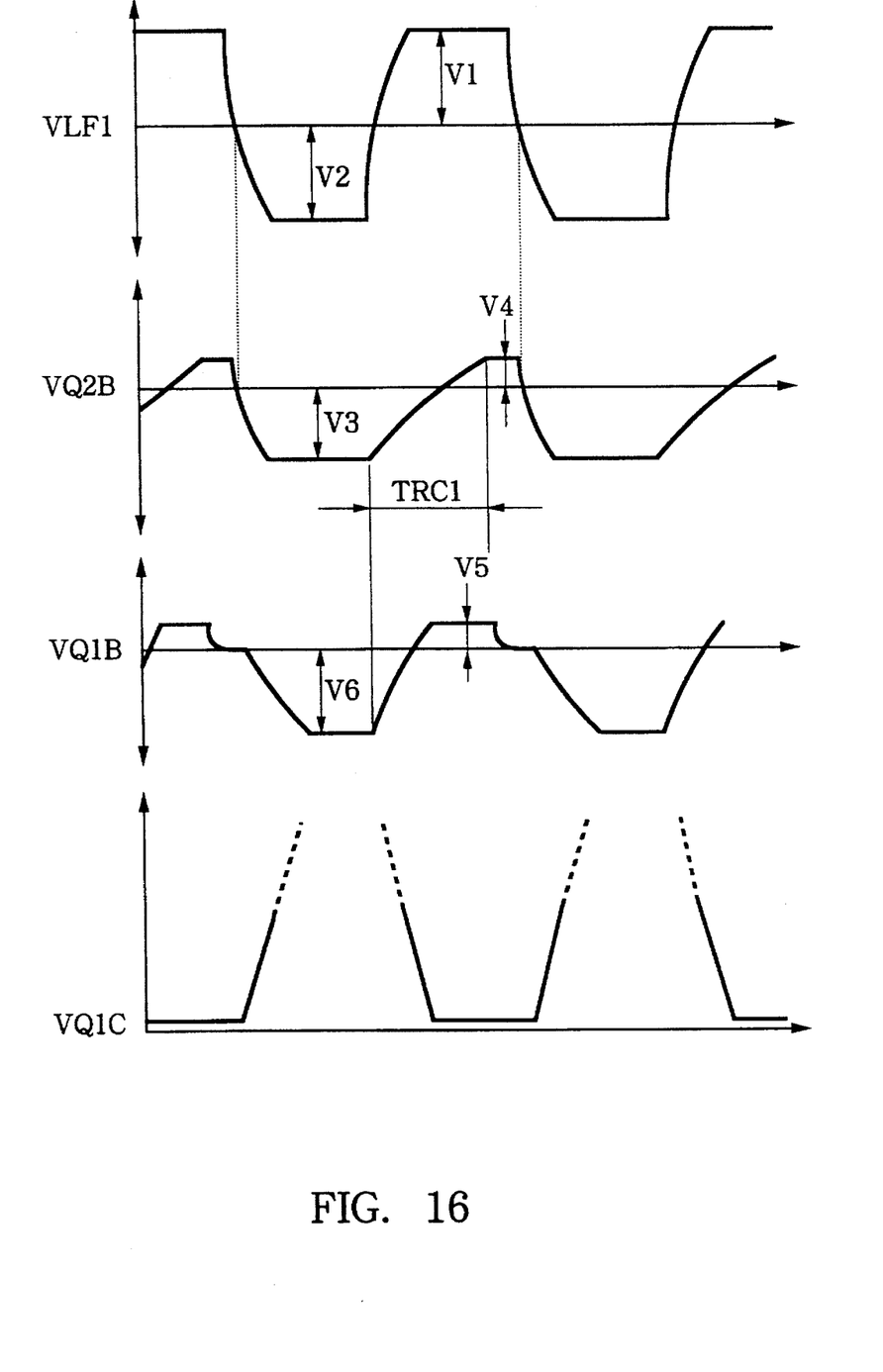
FIG. 16 is a waveform diagram for explaining the operation of the duty factor correction circuit.

The circuit shown in FIG. 15 has completely solved this problem. That is, this circuit can lose the ability to maintain a constant duty factor while maintaining the oscillation frequency at a constant value. This can be realized only by respectively connecting a diode 45 and 46 (not shown) in parallel to the resistances 27R and 28R (27R and 28R) of the time constant circuit in FIG. 8. The operation of the circuit with the added diode 45 (46) will be described below. Assume now that the emitter potential of the main switching transistor 25 and the auxiliary switching transistor 29 is used as reference voltage (zero), the feedback winding voltage is designated by VLF2, the base voltage of the transistor 29 is designated by VQ2B, the base voltage of the transistor 25 by VQ1B and the collector voltage of the transistor 25 by VQ1C. Waveforms of respective voltages are shown in FIG. 16.

Figure 17:
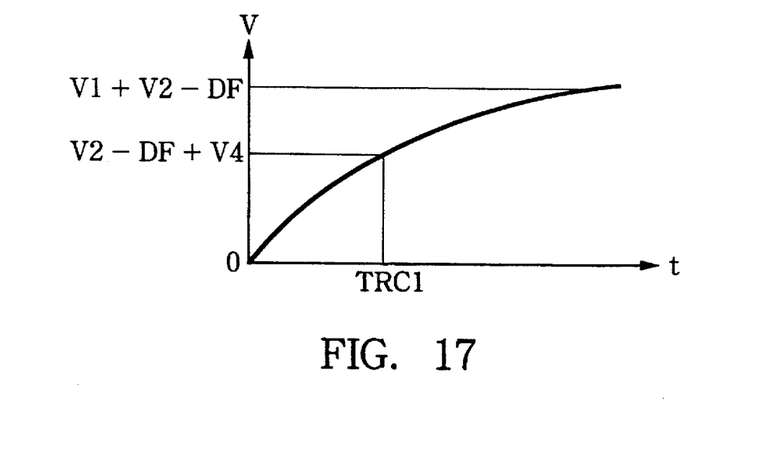
FIG. 17 is a waveform diagram showing the operation of the duty factor correction circuit in the timing control means.

When the feedback winding voltage drops on the negative side, the negative voltage V2 causes the capacitor C2 to charge in the negative direction through the diode 45 of FIG. 15. This voltage is V3. Designating the forward voltage of the diode 45 by Dr, the voltage V3 is V3=V2–DF. When the voltage is inverted and VLF1 has become a positive voltage, the capacitor 27C is charged by current from the resistance 27R and the base voltage VQ2B increases. Simultaneously, the base voltage VQ1B of the transistor 25 increases with some delay from the feedback winding voltage VLF1 due to the time constant of the resistance 35 and the capacitor 31 and, upon reaching of VQ1B to the base-emitter-on voltage VBEQ1 (VS) of the transistor 25, the transistor 25 is turned on. Upon reaching of the increasing VQ2B to the base-emitter-on voltage VBEQ2(V4) of the transistor 29, the transistor 29 is turned on and VQ1B drops. By turning on of the transistor 29, the base current is cut and the transistor 25 whose base accumulated charge has been discharged is turned off and the voltage is thereby inverted. A timing determining the frequency and duty factor is determined by a period of time during which the voltage of the capacitor 27C rises from −V3 to V4. The rising curve during this time period is a part of time constant curve of the time constant circuit 27 from −V3 to +V1. Since there is the relation V3=V2–DF, this curve becomes one shown in FIG. 17. Since DF is constant, the voltage V1+V2–DF is determined by (V1+ V2). When the duty factor changes, the ratio of V1 and V2 changes but, since (V1+V2) is constant, this curve is constant regardless of the duty factor.

Time TRC1 till V3+V4=V2–DF+VQEQ2 in this curve is the timing prepared here. Since DF and VBEQ2 are substantially of the same value, DF and VBEQ2 can be cancelled with each other. Further, since DF is a small value compared with (V1+V2). DF can be neglected for the sake of simplicity. Thus, TRC1 can be determined substantially by the ratio between (V1+V2) and V2. Therefore, even if the power voltage is changed (i.e., (V1+V2) is changed), there will be no change in TRC1 if the ratio between V1 and V2 is constant. On the other hand, time constant TRC2 of the circuit on the opposite side is determined by the ratio between (V1+ V2) and V1. Although the time constant curve is not linear, it can be regarded as substantially linear when the circuit operates in the vicinity of the duty factor of 50% in actual operation (if there is no extreme change in the duty factor) and, accordingly, (TRC1+ TRC2) can be considered to be substantially constant against variation in the power voltage whereby the ratio between TRC1 and TRC2 can be considered to have certain degree of freedom).

In the circuit of FIG. 8, when iD1 is larger than iD2, there takes place the operation, as described before, to increase TRC1 and decrease TRC2. As will be apparent from the curve of FIG. 17, as TRC1 increases, V2 increases and when TRC2 decreases, V1 decreases with resulting stability. Therefore, an operation for determining the duty factor at a point at which iD1 becomes equal to iD2 can be realized.

Figure 18:
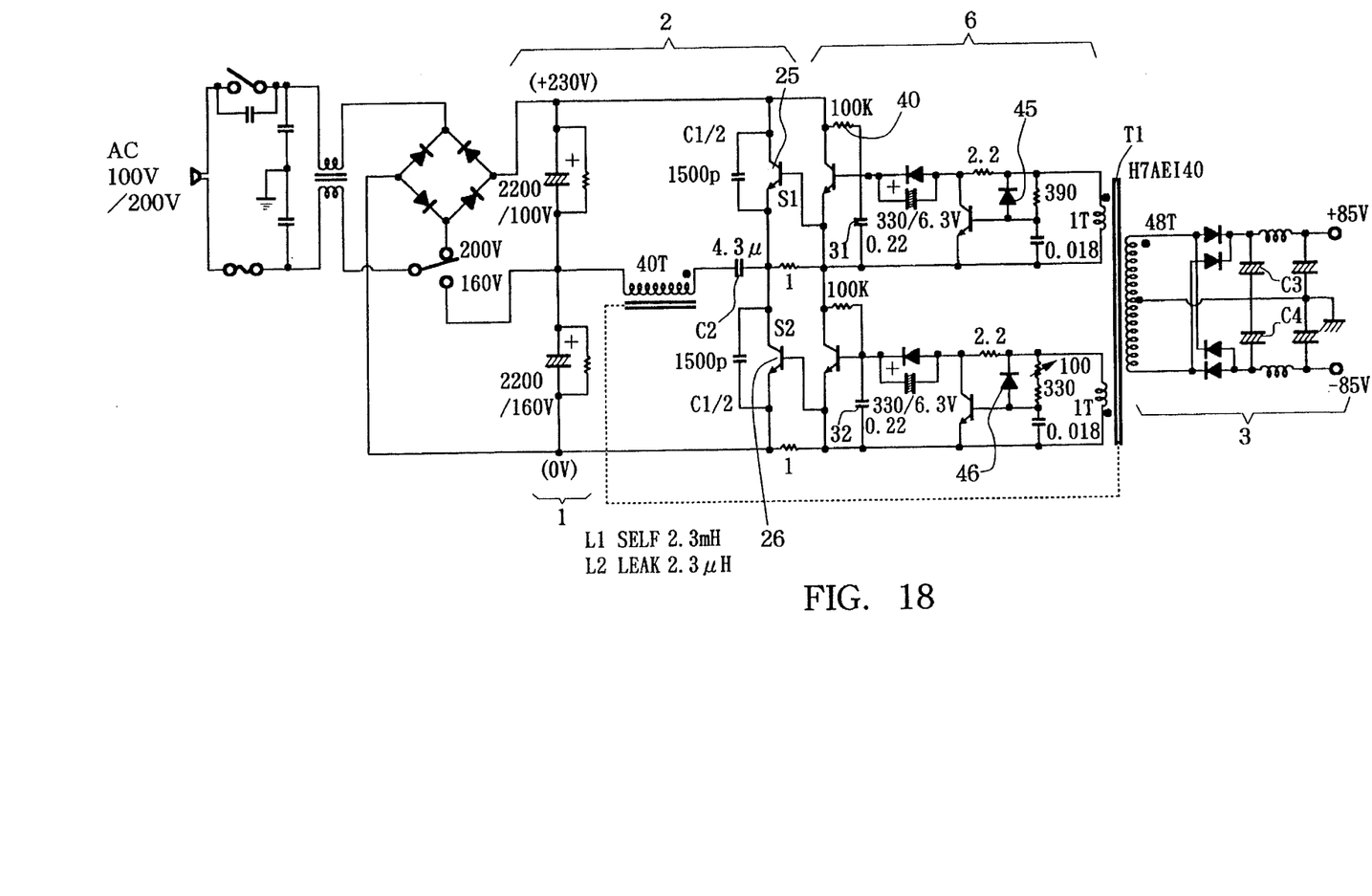
FIG. 18 is a circuit diagram showing a specific construction of the power circuit.

FIG. 18 is a circuit diagram showing a specific circuit of the entire power supply circuit incorporating the invention. In FIG. 18, constants appearing at respective component elements are examples of specific design constants. The respective component elements are designated by the same reference characters as those used for corresponding component elements in the foregoing description. In this specific circuit, the commercial ac power source can be selectively switched between 100 V system and 200 V system. When an ac power of 100 V is used, this circuit becomes a voltage doubler rectification construction. Since a connecting point of both one ends of the input smoothing capacitor CIN1 and CIN2 can be used as reference potential point, a series resonance capacitor C2 is not divided in two capacitors toward power line but is connected as a single capacitor to the transformer winding. By this manner of providing the capacitor, voltage withstanding capacity of the capacitor can be made small and a film capacitor which is of a small loss in its characteristics can be readily used. This power supply circuit is designed with a rated output of 500 W (maximum 1 kW), switching frequency of 5 kHz, current resonance frequency of 50 kHz and voltage resonance frequency of 60 kHz. Actually measured self inductance of the transformer is 2.3 mH and actually measured leakage inductance is 2.3 µH. In this specific circuit, actually measured value of efficiency expressed by the rate of output power provided by the smoothing capacitor to input power to the smoothing capacitor which inputs commercial ac power is about 97% (ref. about 80% in the conventional transformer power supply circuit and about 80%–85% in the conventional switching type power circuit). In this power supply circuit, the amount of noise generated has been reduced by nearly 30 dB as compared with the conventional switching type power supply circuit. Stated more concretely, this is a level at which no problem arises practically when the power circuit is operated without providing any particular shield therefor and an AM broadcasting is received by a radio receiver located near the power circuit.

The invention has been described above with reference to a preferred embodiment. The technical concepts of the invention described above will be summarized below.

This is a technique concerning a power supply circuit according to which, in an inverter circuit of, e.g., a half bridge type, a full bridge type or a push-pull type, current resonance is applied at a timing at which a switching transistor is turned on to supply current to the output and voltage resonance is applied at a timing at which the switching transistor is turned off to switch voltage whereby both current type noise and voltage type noise are reduced by reducing harmonics in both current waveform and voltage waveform, and the efficiency of the power supply circuit is improved by turning on the switching transistor in a voltage zero state and turning off the switching transistor in a current zero state.

This is a technique concerning a power supply circuit which comprises a dc power source, switching means including switching elements capable of being on-off controlled for switching an input from the dc power source to convert it to ac and providing it as an ac output from an output terminal thereof, dc output means for full-wave rectifying and smoothing a supplied ac input to provide a dc output, series resonance means provided in series to current flowing to the output terminal of the switching means, parallel resonance means provided in parallel to voltage produced at the output terminal of the switching means: and switching control means for intermittently controlling the switching elements of the switching means, the dc output being taken out of resonance current of the series resonance means by the dc output means and potential at the output terminal being converted from one potential to another by using parallel resonance voltage of the parallel resonance means, whereby all switching operations of the switching elements of the switching means are performed substantially at a voltage zero state or substantially at a current zero state and harmonic contents in operation voltage and operation current in the circuit are reduced.

In this technique, it is preferable, as conditions for setting values of the respective resonance circuits, that the inductance value L1 of the parallel resonance means is much larger than the inductance value L2 of the series resonance means and the value C1 of the capacitor of the parallel resonance means is much smaller than the value C2 of the series resonance means. The rectification system should be a full-wave rectification system. As the smoothing system, the capacitor input type system should preferably be used for effecting the current resonance and the capacity of the smoothing capacitor should preferably be much larger than the capacity of the capacitor used in the series resonance means to prevent drop in Q factor of the current resonance.

In one aspect of the invention, the power circuit comprises input switching means comprising two switching elements capable of being turned on and off at desired timing for switching them alternately to convert a dc power output to ac and providing it as an ac output from an output terminal thereof, output takeout means for performing a full-wave rectification of a capacitor smoothing type, series resonance means provided in series between the output terminal of the input switching means and an input terminal of the output takeout means, parallel resonance means provided in parallel across one of the switching elements of the input switching means, and timing control means for controlling the on-off timing of the switching elements of the input switching means in such a manner that a time period from turning on till turning off of each of the switching elements is longer than half of resonance period of the series resonance means and a time period from turning off till turning on of each of the switching elements is shorter than half of resonance period of the parallel resonance means.

In one aspect of the invention, the power circuit comprises input switching means comprising two switching elements capable of being turned on and off at desired timing for switching them alternately to convert a dc power output to ac and providing it as an ac output from an output terminal thereof, output takeout means for performing a full-wave rectification of a capacitor smoothing type, series resonance means provided in series between the output terminal of the input switching means and an input terminal of the output takeout means, parallel resonance means provided in parallel across one of the switching elements of the input switching means, and timing control means for controlling the switching means of the input switching means to be turned on alternately and intermittently and controlling the on-off timing of the switching elements in such a manner that an on period of each of the switching elements is longer than half of resonance period of the series resonance means and a time period during which both of the switching elements are off is shorter than half of resonance period of the parallel resonance means.

In one aspect of the invention, the timing control means comprises the circuit shown in FIG. 7 to which added a capacitor for delaying timing of turning on of the main switching element and a diode for enabling duty factor to be automatically changed so that values of currents flowing during the on period of each of the two main switching transistors which are turned on and off alternately become equal to each other. By the provision of the diode, an adverse effect of power voltage variation to change in the oscillation frequency is removed whereby the operation of the switching elements can be easily converted to a self exciting inverter type operation and, moreover, imbalance in positive and negative output currents (resonance current) is automatically corrected and decrease in efficiency and deformation in the voltage resonance waveform due to the current imbalance can thereby be eliminated.

What is claimed is:

1. A power supply circuit comprising:

a dc power source;

switching means including switching elements capable of switching an output from the dc power source to convert the input to ac and outputting ac from an output terminal thereof, the ac changing between two different potentials;

series resonance means provided in series to current flowing from the output terminal of the switching means, the series resonance means being capable of generating resonance current;

parallel resonance means provided in parallel to voltage produced at the output terminal of the switching means, the parallel resonance means being capable of generating resonance voltage and potential at the output terminal of the switching means being converted from one of the two different potentials to the other by using the parallel resonance voltage of the parallel resonance means;

switching control means for controlling the switching elements of the switching means so as to intermittently turn on the switching elements at a constant frequency and independent of a load applied to said circuit; and dc output means for full-wave rectifying and smoothing a supplied ac input, the dc output means being capable of taking out a dc output from the resonance current of the series resonance means, wherein all switching operations of the switching elements of the switching means are performed with a constant period substantially at a voltage zero state or substantially at a current zero state, whereby harmonic contents in operation voltage and operation current in the power supply circuit are reduced.

2. A power supply circuit comprising:

a dc power source;

switching means including switching elements capable of switching an input from the dc power source to convert the input to ac and providing converted input as an ac output from an output terminal thereof;

series resonance means provided in series to current flowing from the output terminal of the switching means, the series resonance means being capable of generating resonance current;

parallel resonance means provided in parallel to voltage produced at the output terminal of the switching means, the parallel resonance means being capable of generating resonance voltage;

dc output means for full-wave rectifying and smoothing a supplied ac input to provide a dc output; and switching control means for controlling the switching elements of the switching means, so that the switching elements are alternately turned on with a constant period and a constant frequency independent of a load applied to said circuit, said switching elements being turned on when the resonance voltage is substantially zero and turned off when the resonance current is substantially zero at the output terminal of the switching means.

3. A power supply circuit as defined in claim 1 wherein said dc output means comprises a diode and a capacitor.

4. A power supply circuit as defined in claim 1 wherein said switching means has two switching elements.

5. A power supply circuit as defined in claim 1 which further comprises a transformer provided in a prior stage of the dc output means.

6. A power supply circuit as defined in claim 5 wherein said transformer comprises a primary winding and a secondary winding.

7. A power supply circuit as defined in claim 6 wherein said parallel resonance means comprises inductance and capacitance and self inductance of the primary winding is used as said inductance.

8. A power supply circuit as defined in claim 6 wherein said series resonance means comprises inductance and capacitance and leakage inductance of the primary winding is used as said inductance.

9. A power supply circuit as defined in claim 1 wherein said series resonance means and said parallel resonance means respectively comprises inductance and capacitance and the inductance of said series resonance means is set at a value which is much smaller than the inductance of the parallel resonance means and the capacitance of said series resonance means is set at a value which is much larger than the capacitance of said parallel resonance means.

10. A power supply circuit as defined in claim 2, further comprising time constant means for controlling said constant period.

11. A power supply circuit as defined in claim 10, further comprising starting means for starting operation of said switching means upon initial application of said input from the dc power source.

* * * * *